United States Patent [19]

van der Lely et al.

[11] 4,113,024
[45] Sep. 12, 1978

[54] SOIL CULTIVATING IMPLEMENTS

[75] Inventors: Ary van der Lely, Maasland; Cornelis Johannes Gerardus Bom, Rozenburg, both of Netherlands

[73] Assignee: C. van der Lely N.V., Maasland, Netherlands

[21] Appl. No.: 772,858

[22] Filed: Feb. 28, 1977

[30] Foreign Application Priority Data

Mar. 1, 1976 [NL] Netherlands .......................... 7602084

[51] Int. Cl.² .............................................. A01B 33/06
[52] U.S. Cl. .......................................... 172/59; 172/68; 172/70; 172/78; 172/413; 172/400; 172/417; 280/104
[58] Field of Search .................... 172/59, 49, 413, 400, 172/401, 417, 68, 63, 70, 78, 421; 280/104

[56] References Cited

U.S. PATENT DOCUMENTS

| 2,888,996 | 6/1959 | Ralston | 172/687 X |
| 3,090,449 | 5/1963 | Ward | 172/413 |
| 3,616,862 | 11/1971 | Lely | 172/59 |
| 3,627,059 | 12/1971 | Jackson | 172/417 |
| 3,633,679 | 1/1972 | Dahlberg | 172/417 |
| 3,892,278 | 7/1975 | Smith | 172/508 |
| 3,951,213 | 4/1976 | Lely | 172/59 |

Primary Examiner—Richard J. Johnson
Attorney, Agent, or Firm—Mason, Mason & Albright

[57] ABSTRACT

A cultivating implement has an elongated frame portion with soil working tines rotatably mounted along the length of the frame portion. The implement is supported, at least in part, by a leading member and a rear member each of which bear on the ground in advance and to the rear of the soil working tines. The supporting members can be wheels, rollers, a row of rods, levelling bars or combinations thereof which are interconnected by at least one linkage. Each supporting member has a respective carrier that is pivoted to a strip or pair of strips secured to the frame portion. The carriers include upwardly extending arms or plates with holes at different levels that receive pins and the pins interconnect the upper portions of the carriers to an adjustable connecting member. When one supporting member is displaced upwardly or downwardly, the other member is displaced in an opposite direction.

19 Claims, 8 Drawing Figures

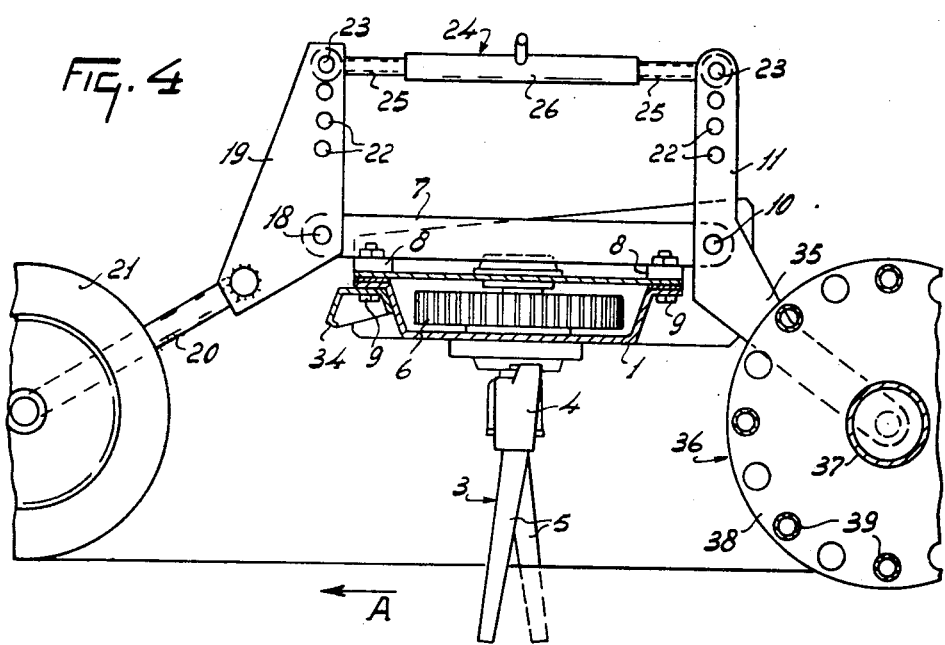
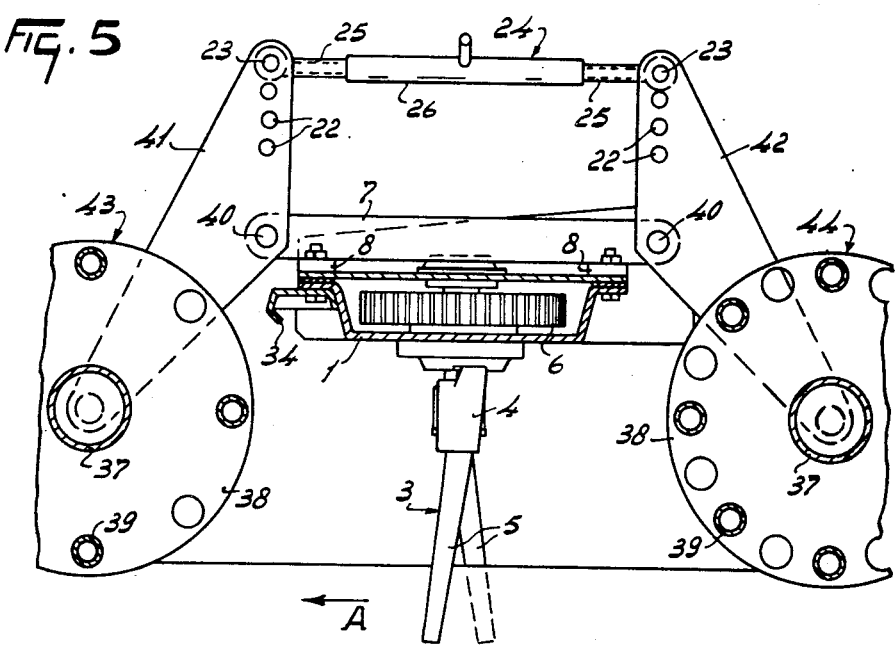

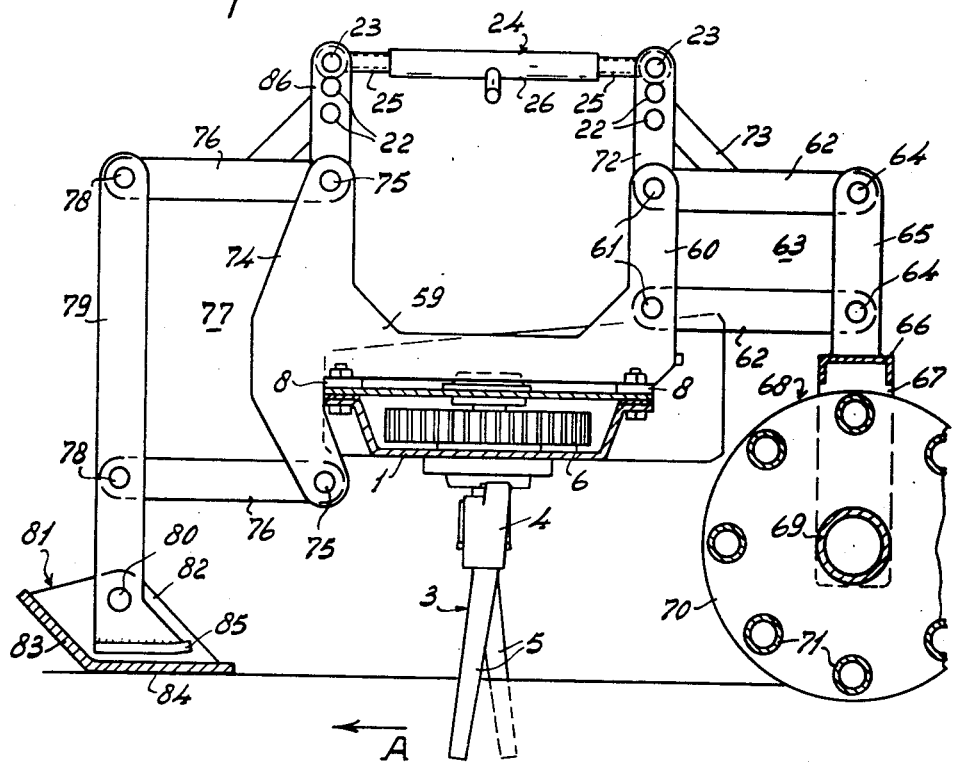

SOIL CULTIVATING IMPLEMENTS

Figure 1:
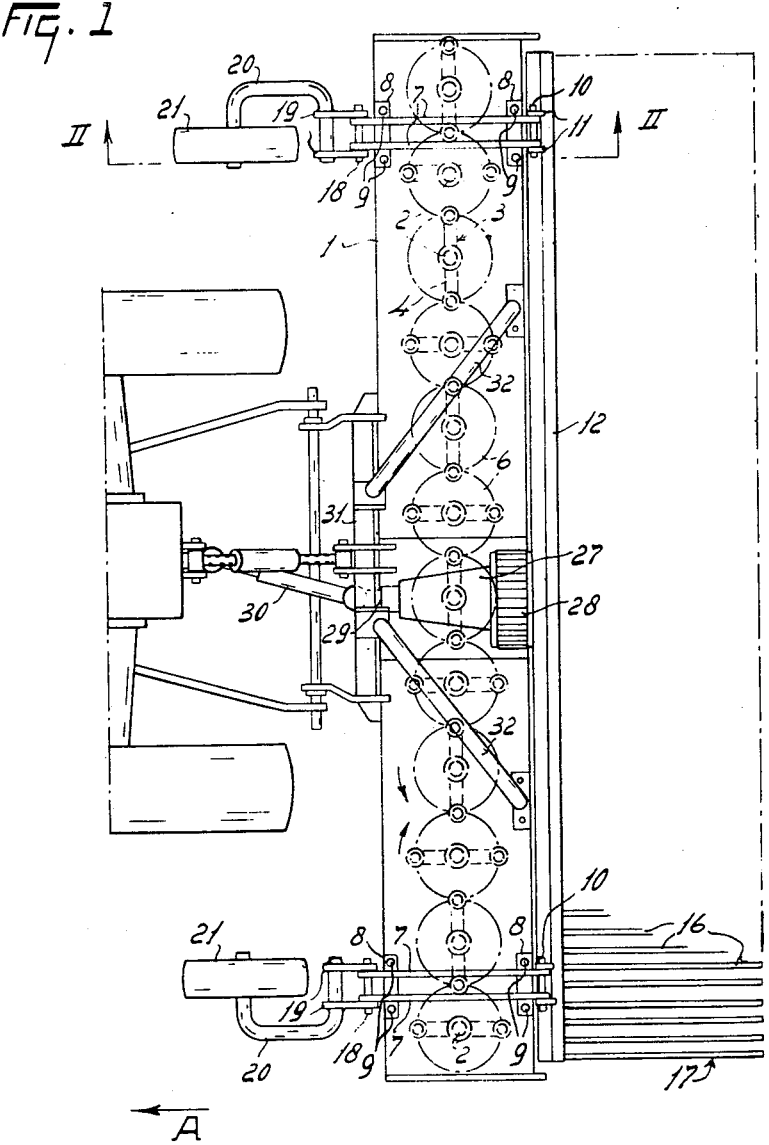
Figure 2:
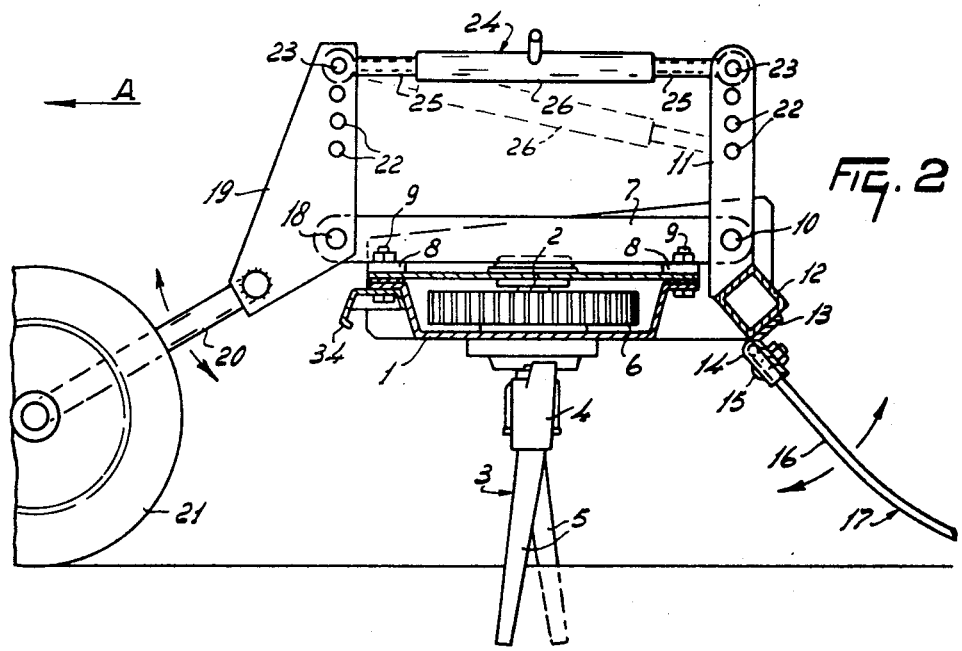
Figure 3:
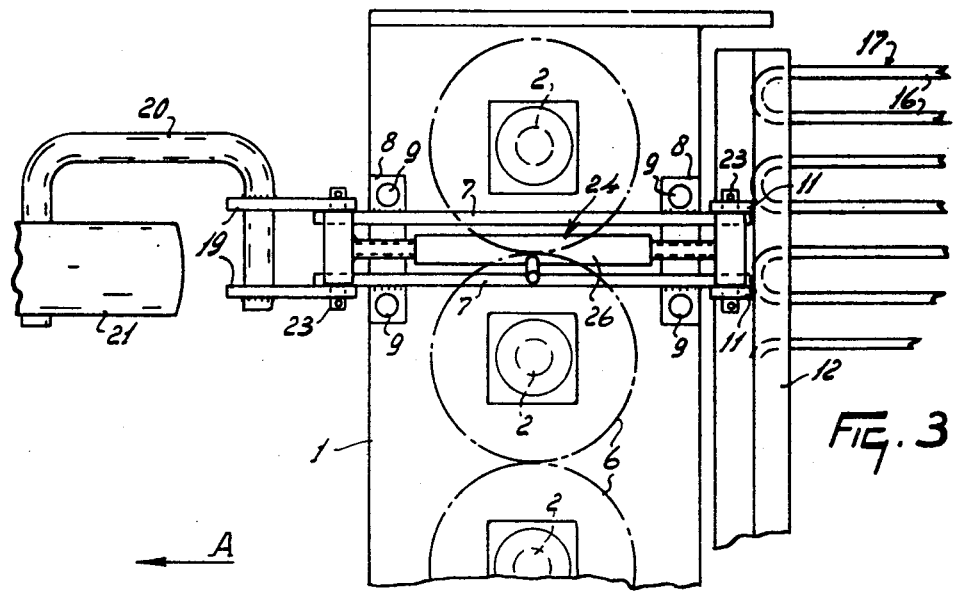

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a plan view, to the same scale as FIG. 2, showing some parts that can be seen in FIG. 1 in greater detail, and FIGS. 4, 5, 6, 7 and 8 are sections which are all taken on the same line as FIG. 2 but that illustrate five alternative embodiments.

Referring to FIGS. 1 to 3 of the accompanying drawings, the soil cultivating implement that is illustrated therein comprises a hollow box-shaped frame portion 1 that extends substantially horizontally transverse, and usually substantially perpendicular, to the indtended direction of operative travel of the implement that is indicated in each Figure of the drawings by an arrow A. A plurality (in this case, 12) of substantially vertical, or at least upwardly extending, shafts 2 are rotatably journalled in bearings in the hollow frame portion 1 so as to lie in a single row, that is parallel to the transverse length of the frame portion 1, with the axes of rotation of the shafts 2 spaced apart from one another at regular intervals which advantageously, but not essentially, have magnitudes of substantially 25 centimeters. The lowermost end of each shaft 2 projects from beneath the bottom of the hollow frame portion 1 and there has a corresponding rotary soil working or cultivating member 3 frimly but releasably secured to it. Each of the twelve rotary soil working or cultivating members 3 comprises a substantially horizontally extending support or carrier 4 which is provided, at both ist opposite ends, with tool holders in which fastening portions of corresponding soil working tools are firmly but releasably secured. In this case, the soil working tools are in the form of rigid tines 5 and it will be evident from FIG. 2 of the drawings that each tine 5 has a soil working portion that is directed downwardly from the corresponding tool holder so as to penetrate into the soil during the use of the implement, said soil working portion being inclined so as to trail rearwardly from top to bottom with respect to the intended direction of operative rotation of the soil working or cultivating member 3 of which it forms a part (see the arrows that indicate the directions of rotation of two immediately neighbouring members 3 in FIG. 1).

Each shaft 2 carries, inside the hollow frame portion 1, a corresponding straight-toothed or spur-toothed pinion 6, said pinions 6 being of such a size, and being so arranged relative to each other, that the teeth of each pinion 6 are in mesh with those of its immediate neighbour, or with those of both of its immediate neighbours, in the single row of twelve pinions 6. With this arrangement, each pinion 6, together with the corresponding shaft 2 and soil working or cultivating member 3, will revolve in the opposite direction to that of its immediate neighbour, or to those of both of its immediate neighbours, when the implement is in use.

The top of the hollow frame portion 1 is provided, at two locations which are spaced inwardly by short distances towards one another from the opposite lateral sides or ends of that frame portion, with corresponding pairs of strips 7. The two strips 7 of each pair are spaced apart from one another by short distance in a direction that is substantially perpendicular to the direction A, said strips being in parallel relationship with one another and, as regards their lengths, parallel or substantially parallel relationship with the direction A. That strip 7 of each pair which is nearest to the corresponding lateral side or end of the frame portion 1 is spaced therefrom by a distance which is equal, or substantially equal, to the regular spacing between the axes of rotation of the shafts 2 which spacing, as has been mentioned above, advantageously has a magnitude of substantially 25 centimeters. Upper front and rear edges of the hollow frame portion 1 have brackets 8 secured to them by substantially vertically disposed bolts 9 at locations which register with the strips 7 and the lower edges of said strips 7 are welded or otherwise fixedly secured to the upper surfaces of said brackets 8 at the points of such registration. The strips 7 of both pairs project, with respect to the direction A, both forwardly beyond the corresponding front brackets 8 and rearwardly behind the corresponding rear brackets 8. A horizontal pivot pin 10 that extends parallel to the transverse length of the hollow frame portion 1 perpendicularly interconnects the rear ends of the two strips 7 of each pair and each pivot pin 10 has a pivotable carrier in the form of a corresponding pair of upwardly extending arms 11 turnably mounted thereon, said arms 11 engaging the corresponding pin 10 alongside the relatively remote surfaces of the two strips 7 concerned.

The lowermost ends of the two upwardly extending arms 11 of each pair are welded or otherwise rigidly secured to a beam 12 that extends substantially horizontally parallel to the transverse length of the frame portion 1, and thus usually substantially perpendicular to the direction A, throughout all, or most, of the combined working width of the 12 rotary soil working or cultivating members 3. As can be seen in FIG. 2 of the drawings, the beam 12 is of hollow formation having a polygonal cross-section which it is preferred should be the square one that is illustrated. The beam 12 is arranged so that one diagonal of its substantially square cross-section is substantially horizontally disposed while the other diagonal is substantially vertically disposed and that flat outer surface of said beam which faces downwardly and rearwardly with respect to the direction A has one limb of a bar 13 of L-shaped cross-section fastened to it. The other limb of said bar 13 has a plurality of elongate elements 16 releasably secured to it by clamping plates 14 and bolts 15. The elongate elements 16 are formed in integral hairpin-shaped pairs and it is the curved junctions between the two elements 16 of each integral pair that co-operate with a corresponding one of the clamping plates 14 and its fastening bolt 15. The elongate elements 16 are formed from resilient material, such as spring steel, which material is preferably, but not essentially, of circular cross-section. The rod-like elongate elements 16 together afford a rear supporting member of the implement that is generally indicated by the reference 17. It can be seen in FIG. 2 of the drawings that each element 16 initially extends downwardly and rearwardly with respect to the direction A from its fastened end and, in fact, a rearmost end portion of each element 16 substantially horizontally disposed in contact with the ground surface when the implement is in operation.

The forwardly projecting leading ends of the two strips 7 of each pair are perpendicularly interconnected by a corresponding pivot pin 18 which is substantially parallel to the transverse length of the hollow frame portion 1 and thus usually substantially perpendicular to the direction A. Two substantially vertically disposed plates 19 whose shapes can be seen in FIG. 2 of the drawings are turnably mounted on each pivot pin 18 alongside the relatively remote surfaces of the two strips 7 concerned and afford a pivotably mounted carrier. The two plates 19 of each pair are parallel to each other and substantially parallel to the direction A and their lower leading extremities, with respect to that direction, have a substantially horizontal portion of a corresponding rigid rod-shaped bracket 20 welded or otherwise rigidy secured to them in interconnecting relationship. Each bracket 20 has a limb which is parallel to the limb thereof that is fastened to the respective pair of plates 19 and said parallel limb affords the substantially horizontal axle of a corresponding tured ground wheel 21 that is mounted thereon in a freely rotatable manner. The two parallel portions of each rod-shaped bracket 20 are rigidly interconnected by a relatively perpendicular portion which, as can be seen in FIG. 2 of the drawings, is inclined downwardly and forwardly with respect to the direction A from the corresponding pair of plates 19 to the corresponding axle portion. The inclined portions constitute the webs or bases of said brackets 20 and it will be noted from FIG. 1 that they are located at the ends of the corresponding parallel portions of the brackets that are remote from the center of the implement. The two ground wheels 21 constitute a leading supporting member of the implement.

Each pair of upwardly extending arms 11 and each pair of plates 19 is formed with an upwardly extending row of spaced holes 22 with the holes 22 in the two arms 11 of each pair in horizontal register with one another, the holes 22 in the plates 19 being similarly arranged. Any chosen substantially horizontally aligned pair of holes 22 can co-operate with a releasable pivot pin 23 and said pivot pins 23 can thus be used to couple one end of a corresponding connecting means 24 turnably to the arms 11 or plates 19 concerned. Each connecting means 24 comprises two rods 25 that are formed along their lengths with screwthreads which are wound in opposite directions. One end of each screwthreaded rod 25 carries a sleeve bearing which co-operates with the corresponding pivot pin 23 while the other end thereof is entered lengthwise into an interconnecting internally screwthreaded sleeve 26. Opposite end regions of the internally screwthreaded sleeve 26 have internal screwthreads that are wound in opposite directions to match, and co-operate with, the screwthreads of the corresponding pair of rods 25 and the external surface of each sleeve 26 is preferably, as illustrated, provided with a projecting lever to enable said sleeve to be rotated easily about its own longitudinal axis. It will be evident that, with this construction, rotation of the sleeve 26 of each connecting means 24 in one direction will cause an increase in the effective length of that connecting means while rotation of the sleeve 26 in the opposite direction will cause a reduction in the effective length of said connecting means. FIG. 2 of the drawings shows one of the two connecting means 24 in its uppermost possible position between the corresponding pair of arms 11 and corresponding pair of plates 19 but it will be realised that said means 24 could occupy any chosen one of a number of other different positions relative to the arms 11 and plates 19. Such positions need not necessarily be ones in which the pivot pins 23 are substantially equally spaced from the corresponding pivot pins 10 and 18 but could be ones in which said spacings are significantly different. For example, the connecting means 24 that can be seen in FIG. 2 of the drawings could extend between the lowermost holes 22 in the plates 19 and the uppermost holes 22 in the arms 11.

One of the center pair of the twelve shafts 2 that are rotatably mounted in the hollow frame portion 1 has an upward extension through the top of said frame portion into a gear box 27 that is fastened in position on top of the frame portion. A bevel pinion and shaft transmission (not visible) within the gear box 27 places said shaft extension in driven connection with a substantially horizontal shaft 29 of said gear box whose leading end with respect to the direction A projects forwardly from the front of the gear box where it is splined or otherwise keyde to enable it to be placed in driven connection with the power take-off shaft of an agricultural tractor or other operating vehicle through the intermediary of a telescopic transmission shaft 30, which is of a construction that is known per se, having universal joints at its opposite ends. The back of the gear box 27 with respect to the direction A has a change-speed gear 28 fastened to it. It is not necessary to describe the change-speed gear 28 in detail for the purposes of the present invention but, briefly, the rearmost end of the shaft 29, and the rearmost end of a further shaft which is not visible in the drawings both project through the back of the gear box 27 into the change-speed gear 28 where their splined or otherwise keyed ends can be furnished with co-operating exchangeable pairs of interchangeable straight-toothed or spur-toothed pinions so that the particular pair that is chosen, and its arrangement of the shaft ends, dictates the transmission ratio between the shaft 29 and the underlying and relatively parallel shaft that is not visible in the drawings and thus the speed at which the soil working or cultivating member 3 will be driven in response to a more or less constant input speed of rotation that is applied to the leading end of the shaft 29.

The front of the hollow frame portion 1 with respect to the direction A is provided with a coupling member or trestle 31 which is of substantially triangular configuration as seen in front or rear elevation, said coupling member or trestle 31 being located midway between the general planes of substantially vertical side plates of the frame portion 1 that extend parallel to one another and substantially parallel to the direction A. Strengthening tie beams 32 interconnect an upper region of the coupling member or trestle 31 and well spaced apart locations at the top and rear of the hollow frame portion 1, said tie beams 32 being in downwardly and rearwardly, with respect to the direction A, divergent relationsip from said coupling member or trestle 31 to the ends thereof that are secured to the frame portion 1. The coupling member or trestle 31 is constructed and arranged for connection to the three-point lifting device or hitch that is carried at the rear of an agricultural tractor or other operating vehicle, such connection being known per se and being visible, in outline, in FIG. 1 of the drawings. Stop plates 34 (FIG. 2) are mounted at the front of the hollow frame portion 1 with respect to the direction A by the same bolts 9 as fasten the two brackets 8 to that frame portion. Forwardly directed surfaces of the two stop plates 34 lie in the paths of downward pivotal movement of lower edges of the two plates 19 of each pair about the corresponding pivot pins 18 and thus ensure that said plates 19 cannot turn too far in an anticlockwise direction (as seen in FIG. 2) about the pivot pins 18.

FIG. 4 of the drawings illustrates an embodiment in which the lower ends of the arms 11 are extended to form downwardly and rearwardly, with respect to the direction A, pairs of inclined supports 35. The lowermost and rearmost ends of the supports 35 carry substantially horizontally aligned bearings between which a freely rotatable rear supporting member of the implement, in the form of a ground roller 36 of open construction, can revolve. The axis of rotation of the roller 36 extents substantially horizontally transverse, and usually substantially perpendicular, to the direction A and said roller comprises a central tubular carrier 37 to which a plurality of circular support plates 38 are fastened at substantially regular intervals along the axial length of the roller, the substantially vertically disposed support plates 38 being in parallel relationsip with one another and substantially parallel relationship with the direction A. A plurality, such as 16, of holes are formed around the periphery of each support plate 38 at regularly spaced apart intervals and elongate elements 39 of tubular formation, as illustrated, or of rod-like formation are entered lengthwise through the holes in the successive support plates 38. The elongate elements 39 may be arranged so as to extend parallel or substantially parallel to the axis of rotation of the roller or may be wound helically therearound to some extent so as to extend merely lengthwise of the roller but not strictly parallel to its axis of rotation. It can be seen from FIG. 4 of the drawings that only eight of the elongate elements 39 are provided for entry through the sixteen holes in each plate 38. This is merely one of a number of different possible arrangements which enable alternative holes to be used to reduce the rate of wear upon their rims and that enable greater or lesser numbers of the elements 39 to the employed having regard to the nature and condition of the soil that is to be cultivated. For example, generally speaking, blocking of the roller 36 with mud under wet soil conditions can be reduced, if not entirely avoided, by reducing the number of elements 39 to a lesser total than is appropriate when work on relatively dry soil is to be undertaken.

FIG. 5 of the drawings illustrates an embodiment in which both the pairs of arms 11 and pairs of plates 19 are replaced by pairs of front plates 41 and rear plates 42. The front and rear plates 41 and 42 are turnably connected to the leading and rear ends of the pairs of strips 7 by substantially horizontal pivot pins 40 that are equivalent to the previously described pins 10 and 18. It can be seen from from FIG. 5 of the drawings that the plates 41 and 42 are substantially identical and that each of them is of basically triangular configuration. The pairs of front plates 41 rotatably carry a leading supporting member in the form of an open ground roller 43 and the pairs of plates 42 rotatably carry a rear supporting member in the form of an open ground roller 44. The rotary mountings for said rollers 43 and 44 are located very close to the leading lowermost corners of the plates 41 and to the trailing lowermost corners of the plates 42, respectively. The ground roller 44 that affords the rear supporting member of the implement is similar, if not identical, in construction to the previously described ground roller 36 but the front ground roller 43, while being of substantially the same diameter as the roller 44, has a lesser number (such as eight) of peripheral holes per support plate 38 and a lesser number of the elongate elements 39. As illustrated, only four of the eight peripheral holes per support plate 38 co-operate with four of the elements 39 in the front roller 43.

Figure 6:
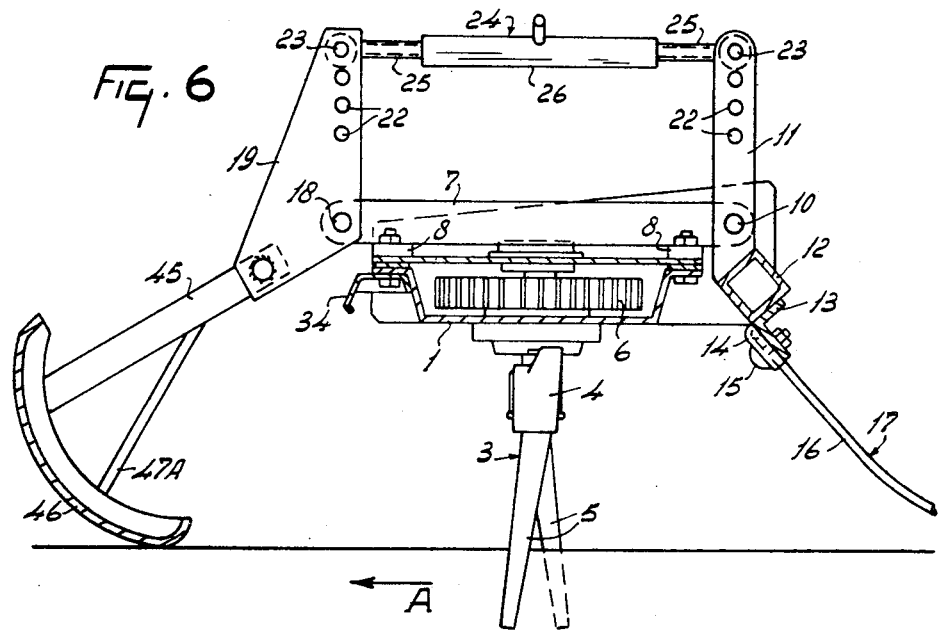

FIG. 6 of the drawings illustrates an embodiment that is similar or identical in most respects to the embodiment of FIGS. 1 to 3. However, in the embodiment of FIG. 6, a leading supporting member 46 in the form of a levelling element is rigidly connected to the pairs of plates 19 by rigid carriers 45. The leading supporting member 46 extends throughout the working width of the implement at the front thereof and is in the form of a plate of circular cylindrical curvature whose convex surface faces downwardly to contact the ground. The leading upper and trailing lower, as shown in FIG. 6 of the drawings, edges of the plate which affords the leading supporting member 46 are bent over towards the concave side of said plate to form upwardly extending and flat or substantially flat rims. Struts 47A interconnect the rigid carriers 45 and the concave rear surface of the supporting member 46 to strengthen the assembly and ensure the rigidity of the connections between the carriers 45 and said supporting member 46.

Figure 7:
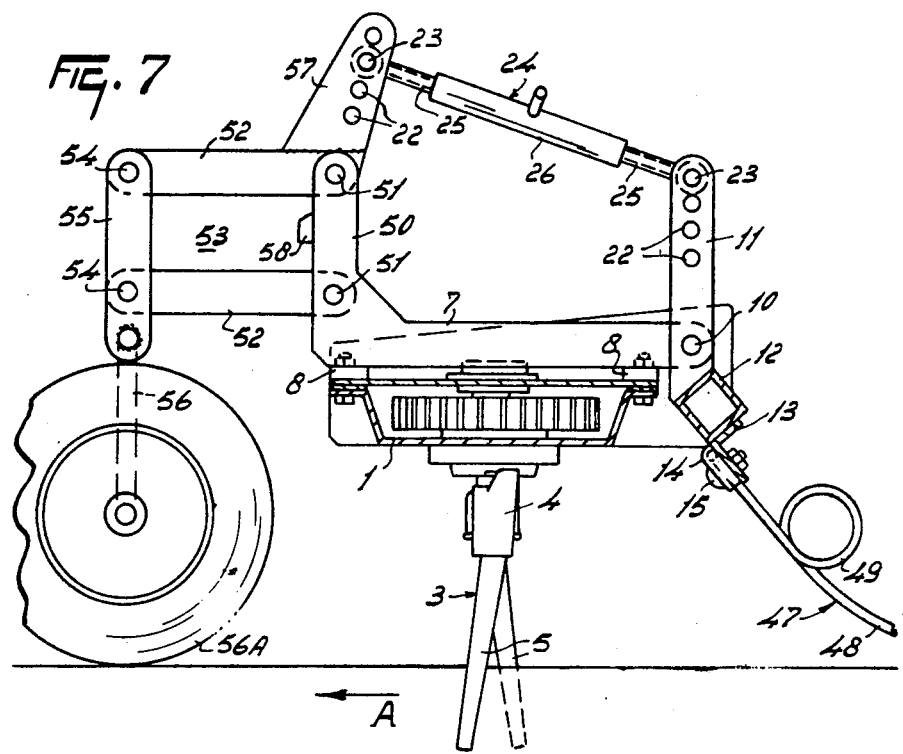

FIG. 7 of the drawings illustrates an embodiment which is again similar, in many respects, to the embodiment of FIGS. 1 to 3 of the drawings and particularly in respect to the disposition of a rear supporting member 47 of the implement that is equivalent in function to the rear supporting member 17. However, in this case, the elongate elements 16 are replaced by integrally interconnected pairs of elongate elements 48, said elements 48 being formed from resilient rod-shaped material, such as spring steel, that is preferably, but not essentially, of circular cross-section. Portions of the elements 48 that are not visible in FIG. 7 extend substantially horizontally in contact with the ground surface when the implement is in use and further portions of those elements that lie between the ground-engaging portions and the parts thereof that are clamped to the bar 13 integrally incorporate helically wound coils 49. This construction considerably increases the resiliency of the connection between the portions of the elements 48 which contact the ground surface and said bar 13.

In the embodiment of FIG. 7 of the drawings, the leading ends of the two strips 7 of each pair are extended upwardly in an integral manner to form upright supports 50 and forwardly directed strip-shaped links 52 have their rearmost ends pivotally connected to the upright supports 50 by corresponding upper and lower parallel and substantially horizontally disposed pivot pins 51. The leading ends of the links 52 with respect to the direction A are turnably connected by further parallel and substantially horizontally disposed upper and lower pivot pins 54 to upright brackets 55 and it will be clear from FIG. 7 of the drawings that parallelogram linkages 53 are thus formed whose constructions and arrangements are such that the supports 50 and brackets 55 are capable of upward and downward movements relative to each other, such movements not involving any significant tilting. The lowermost ends of the upright brackets 55 project downwardly beneath the lower pivot pins by which said brackets are turnably connected to the lower links 52 and the downwardly projecting portions are welded or otherwise rigidly secured to upper limbs of corresponding rod-shaped brackets 56 whose constructions are very similar to those of the previously described rod-shaped brackets 20. Thus, the lower limbs of said brackets 56 that are parallel to the limbs thereof which are secured to the upright brackets 55 serve as axles and have a leading supporting member in the form of corresponding tired ground wheels 56A mounted on them in a freely rotatable manner. The rod-shaped brackets 56 are arranged in a similar way to the brackets 20 inasmuch as the webs or bases thereof that rigidly and integrally interconnect the parallel limbs are located at those sides of the corresponding ground wheels 56A which are remote from the centre of the implement.

The upper links 52 of each parallelogram linkage 53 carry, on their upper edges and at the rearmost ends thereof with respect to the direction A, corresponding pairs of arms 57 which extend upwardly from said links 52 in rearwardly inclined relationship with the direction A at least when the various parts of the implement occupy the positions thereof that are shown in FIG. 7. The arms 57 are formed with a number (such as four) of the holes 22 which holes are arranged in vertically spaced apart relationship as described above, each hole 22 in one arm 57 being in substantially horizontal alignment with a corresponding hole 22 in the other arm 57 of the same pair. FIG. 7 of the drawings shows one of the two connecting means 24 extending between the corresponding rear pivot pin 23 which is engaged in the uppermost holes 22 of the corresponding pair of arms 11 and the respective leading pivot pin 23 which is engaged in those holes 22 in the corresponding pair of arms 57 which are next below the uppermost holes 22. Stops 58 interconnect the leading edges of the upright supports 50 and are so disposed that they limit the downward displacement of the upright brackets 55 which are possible relative to the supports 50 upon downward pivotal movements of the links 52 about the upper and lower rear pivot pins 51.

FIG. 8 of the drawings illustrates an embodiment in which pairs of strips 59 that are equivalent to the previously described strips 7 are arranged in place of said strips 7, the strips 59 differing from the strips 7 inasmuch as the rearmost end of each strip 59 with respect to the direction A integrally incorporates an upright support 60 whereas the leading end thereof with respect to the same direction integrally incorporates an upright plate-shaped support 74. Parallel and substantially horizontally disposed upper and lower pivot pins 61 turnably connect the leading ends of upper and lower links 62 to the upright supports 60, the rearmost ends of said links 62 being turnably connected by further parallel and substantially horizontally disposed upper and lower pivot pins 64 to corresponding locations on respective upright brackets 65. Parallelogram linkages 63 are thus formed which allow the supports 60 and brackets 65 to move upwardly and downwardly relative to one another without significant tilting. The upright brackets 65 projects downwardly beneath the lower pivot pins 64 by which they are connected to the lower links 62 in a freely turnable manner and the lowermost ends of said brackets 65 are welded or otherwise rigidly secured to the upper surface of a transverse beam 66 which is of inverted channel-shaped cross-section and that extends substantially horizontally parallel to the transverse length of the hollow frame portion 1. The beam 66 is provided, at or near its opposite ends, with support 67 that extend downwardly therefrom and a rear supporting member of the implement in the form of an open ground roller 68 is mounted in a freely rotatable manner between the lowermost ends of the downwardly extending supports 67. The roller 68 comprises a central axially extending tubular support 69 to which a plurality of substantially circular support plates 70 are secured at regular intervals along the length thereof with said support plates 70 in substantially vertically disposed parallel relationship with one another and substantially parallel relationship with the direction A. Each support plate 70 is formed, very close to its periphery, with a plurality (such as eight) of circular holes through which holes elongate elements 71 are entered, said elelements 71 being of tubular formation, as illustrated, or, if preferred, of solid rod-like formation. The elements 71 may extend strictly parallel to the axis of rotation of the roller 68 or, if preferred, may be wound helically therearound to some extent so as to extend merely lengthwise of said roller but not strictly parallel to its axis of rotation.

The upper links 62 of each parallelogram linkage 63 are provided above the corresponding upper pivot pins 61 with upwardly extending arms 72 in each of which arms a row of the vertically spaced apart holes 22 is provided, said holes 22 in the two arms 72 of each pair being arranged in the same manner as has already been described above with respect to the arms 11, the plates 19 and the arms 57. The perpendicular connections between the links 62 and the upwardly extending arms 72 are strengthened by the provision of obliquely interconnecting struts 73 that are spaced from the upper pivot pins 61.

The previously mentioned upright plate-shaped supports 74 that are provided at the leading ends of the strips 59, with respect to the direction A, have upper ends that are located at substantially the same horizontal level as are the upper ends of the rear upright supports 60. However, the upright supports 74 are of elongate formation in a vertical direction and their lowermost ends project downwardly in front of the hollow frame portion 1 to terminate at a level which is beneath that of the bottom of said frame portion 1. Parallel and substantially horizontally disposed upper and lower pivot pins 75 turnably connect the uppermost and lowermost ends of the upright supports 74 to the rear ends of corresponding forwardly extending upper and lower links 76, the leading ends of said links 76 with respect to the direction A being connected in a freely turnable manner to corresponding upright carrier brackets 79 by upper and lower pivot pins 78 that are substantially horizontally disposed in parallel relationship with each other and with the pivot pins 75. Front parallelogram linkages 77 are thus formed that allow the supports 74 and carrier brackets 79 to move upwardly and downwardly relative to one another without significant tilting.

The carrier brackets 79 project downwardly beneath the lower pivot pins 78 by which they are connected to the corresponding lower links 76 and, near their lowermost ends, said carrier brackets 79 have a leading supporting member 81 in the form of a levelling element turnably connected to them by substantially horizontally aligned pivots 80 that define an axis which is parallel or substantially parallel to the transverse length of the hollow frame portion 1. The pivots 80 are actually carried by upright lugs 82 mounted on the upper surface of the supporting member 81 which is remote from the surface thereof that contacts the ground during the use of the implement. The supporting member 81 extends throughout substantially the whole of the working width of the implement and comprises two flat and rigid plate-shaped parts 83 and 84 that are integrally or rigidly interconnected so as to enclose an obtuse angle between their general planes (see FIG. 8). The part 84 is usually substantially horizontally disposed with its lower surface in contact with the ground while the part 83, which lies in front of said part 84 with respect to the direction A, extends upwardly and forwardly from the leading edge of the part 84 at an angle of substantially 45° to the ground surface. The lowermost end of each carrier bracket 79 is provided, beneath the corresponding pivot 80, with a stop 85, said stops 85 being so disposed that, as will be evident from FIG. 8 of the drawings, they severely restrict the free angular displacement of the leading supporting member 81 about the axis defined by the pivots 80 which is possible.

The upper links 76 of each parallelogram linkage 77 are provided, above the corresponding upper pivot pins 75, with upwardly extending arms 86 which arms are formed with rows of the holes 22. The perpendicular connections between the links 76 and the arms 86 are strengthened by the provision of oblique struts that are similar ot the previously described struts 73 which strengthen the connections between the links 62 and the arms 72. The arms 86 have the same upright lengths as do the arms 72 and FIG. 8 of the drawings shows one of the two connecting means 24 pivotally coupling the uppermost ends of one pair of the arms 72 to the uppermost ends of the corresponding pair of arms 86, the pivot pins 23 thus co-operating with the uppermost pairs of holes 22 in said arms. As illustrated, each of the arms 72 and 86 is formed with three of the holes 22 that are vertically spaced apart from one another.

In the use of one of the soil cultivating implements that has been described, its coupling member or trestle 31 is connected to the three-point lifting device or hitch of an agricultural tractor or other operating vehicle in the manner that can be seen in FIG. 1 of the drawings and that is generally known per se and the forwardly projecting rotary input shaft 29 of the gear box 27 is placed in driven connection with the rear power take-off shaft of the same tractor or other operating vehicle by way of the known telescopic transmission shaft 30 that has universal joints at its opposite ends. If required, the change-speed gear 28 is adjusted, before work commences, to ensure that the speed of rotation of the soil working or cultivating members 3 will be appropriate to the nature and condition of the soil that is to be dealt with and the particular purpose for which that soil is required after cultivation. The depth to which the tines 5 of the members 3 will penetrate into the soil during operation can be increased or decreased, before work commences, by decreasing or increasing the effective lengths of the connecting means 24. Alteration of the length of the means 24 allows the leading and rear supporting members of the implement to turn either upwardly or downwardly relative to its hollow frame portion 1 FIG. 2, arrows thus altering the levels of those portions of said members that contact the soil relative to its frame portion 1 with a consequent raising or lowering of that frame portion, which carries the members 3, relative to the ground surface. The tines 5 of each member 3 are spaced apart from one another by a distance which is a little greater than is the distance between the axes of rotation of immediately neighbouring members 3 so that, during operative progress in the direction A, the strips of land that are worked by the individual members 3 overlap one another to produce, in effect, a single broad strip of worked soil which, when the illustrated implement has the preferred dimensions that have been mentioned above, will have a width of substantially 3 meters. As the implement of FIGS. 1 to 3 of the drawings makes operative progress over the ground in the direction A, the pivotably mounted arms 11 and plates 19 which indirectly carry the rear and leading supporting members of the implement are turnable relative to the strips 7, and thus to the frame portion 1, about the axes defined by the corresponding pivot pins 10 and 18. Since said arms 11 and plates 19 are pivotally coupled together by the connecting means 24, an upward displacement of the leading supporting member produces a downward displacement of the rear supporting member and vice versa and it has been found that this arrangement is highly conducive to the stability of the frame portion 1 so that the implement will proceed in the direction A without undue vibration, this being, in turn, conducive to an optimum cultivating effect of the soil working or cultivating members 3.

As previously mentioned, a number of different arrangements of the connecting means 24 between the arms 11 and 19 are possible employing different pairs of the holes 22. Depending upon the particular pairs of holes 22 that are chosen, upward and downward displacements of the leading supporting member can be arranged to produce greater or smaller downward and upward displacements of the rear supporting member 17 and vice versa. A minimum displacement is achieved with the dot and dash position of the connecting means 24 as indicated in FIG. 2. In the embodiment of FIGS. 1 to 3 of the drawings, the ground wheels 21 function only as the leading supporting member of the implement whereas the elongate elements 16 of the rear supporting member 17 additionally serve to crumble any residual lumps of soil that may have been left on the ground surface after the action of the tines 5 and to leave the broad strip of soil that has been worked by the tines 5 of the rotary soil working or cultivating members 3 in a uniformly broken up and substantially level condition.

In the use of the embodiment that has been described with reference to FIG. 4 of the drawings, the rear supporting member of the implement that is afforded by the open ground roller 36 additionallly has a crumbling effect upon any lumps of soil that are left on the ground surface by the foregoing tines and tends to distribute the worked soil substantially uniformly throughout the working width of the implement. As previously mentioned, the form of the roller 36 can be adapted to the prevailing working conditions. Under very wet and muddy conditions, the number of the elements 39 is preferably reduced to avoid the roller becoming filled with mud. However, when relatively dry land is being cultivated it is generally preferable that the number of the elements 39 should be increases since there is then only a small danger of the interior of the roller 36 becoming blocked with mud or other loose soil.

In the use of an embodiment constructed in accordance with FIG. 5 of the drawings, the open ground roller 43 which affords the leading supporting member of the implement subjects the broad strip of ground that is to be worked by the rotary soil working or cultivating members 3 to a crushing and levelling pre-treatment which is frequently advantageous, particularly when the land that is being dealt with is in a rough condition. Similarly, when using an embodiment constructed in accordance with FIG. 6 of the drawings, the leading supporting member 46 that extends throughout substantially the whole of the working width of the implement subjects the land that is to be tilled by the rotary soil working or cultivating members 3 to a crushing and leveling pre-treatment, the convex surface of the member 46 which engages the soil being effective in crushing and flattening any soil lumps or ridges that may be met with.

In the embodiment of FIG. 7 of the drawings, the leading supporting member of the implement is afforded by the ground wheels 56A, the axles of said ground wheels being indirectly connected to the frame portion 1 of the implement through the intermediary of the parallelogram linkages 53. One of the advantages of this arrangement is that, during operation, the ground wheels 56A move more nearly vertically upwards and downwards relative to the frame portion 1 so that less free space is required for the movements of the ground wheels 56A than is necessary for the leading supporting members of the preceding embodiments. The inclusion of the coils 49 in the elongate elements 48 that principally afford the rear supporting member 47 of the implement of FIG. 7 ensures that connections of adequate flexibility exist between the portions of said element 48 that contact the soil and the portions thereof which are clamped to the bar 13. This enhanced flexibility augments the ability of the portions of the elements 48 that contact the ground surface to break up any remaining lumps of soil on that surface and to bring the soil to a uniformly broken and substantially unridged condition throughout the width of the cultivated strip of land.

In the embodiment of FIG. 8 of the drawings, both the leading supporting member 81 and the ground roller 68 that affords the rear supporting member of the implement are indirectly connected to the hollow frame portion 1 thereof through the intermediary of the corresponding parallelogram linkages 77 and 63 so that said frame portion, and thus the rotary soil working or cultivating members 3, are carried by the leading and rear supporting members in a manner which ensures that the frame portion 1 will pass over the soil in the direction A in a very stable condition that allows the members 3 to perform their soil tilling function in an optimum manner even when the surface of the land that is being dealt with is undulating and/or very uneven. The roller 68 that affords the rear supporting member of the implement performs a lump-crushing, smoothing and levelling action in the same manner as do the ground rollers of some of the preceding embodiments whilst the leading supporting member 81 pre-treats the soil that is to be worked by the immediately following members 3, ensuring, in particular, that any ridges and like discontinuities in the surface are flattened out. The limited pivotability of the member 81 about the axis defined by the pivots 80 that is possible relative to the carrier brackets 79 enables the member 81 to turn through a few degrees and thus follow the direction of any general inclination of the ground surface to the horizontal.

Although not illustrated in the accompanying drawings, it is noted that the rear supporting member of the implement could be afforded by a transverse levelling beam instead of by an open ground roller or a plurality of elongate elements of resilient formation. A soil cultivating implement in accordance with the invention ensures that the rotary soil working or cultivating members 3 thereof move over the ground in bodily stable positions, it being possible for the pivotally interconnected leading and rear supporting members of the implement that bring about this improved stability to be constructed in such a way that they can subject the soil to pre-treatment and/or to post-treatment.

Although various features of the soil cultivating implement embodiments that have been described and/or that are illustrated in the accompanying drawings will be set forth in the following claims as inventive features, it is emphasised that the invention is not necessarily limited to those features and that it includes within its scope each of the parts of each soil cultivating implement that has been described and/or that is illustrated in the accompanying drawings, both individually and in various combinations.

What we claim is:

1. A soil cultivating implement comprising a frame and soil working means supported on an elongated portion of said frame, a leading supporting member being pivoted to said frame and positioned in front of said frame portion, a rear supporting member being pivoted to said frame and located to the rear of said frame portion, each of the supporting members bearing on the ground and supporting the implement during normal operation, said supporting members being connected to said frame portion by pivots and interconnected to one another with linkage means, said linkage means including at least one connection member located substantially above said frame portion, and said pivots, the pivotal movements of one supporting member with respect to the frame portion being transmitted to the other member through said pivots and the connection member, whereby the pivotal movements of said one member in one vertical direction displaces the other member in an opposite direction during implement travel.

2. An implement as claimed in claim 1, wherein each supporting member comprises a carrier with a corresponding upwardly extending arm and the carrier arms of the supporting members are interconnected by said connection member.

3. An implement as claimed in claim 2, wherein there are two connecting members positioned in spaced apart relationship, each connecting member linking the leading and rear supporting members together.

4. An implement as claimed in claim 3, wherein the opposite ends of each connecting member are pivotably connectable to any chosen one of a number of different connecting points at different horizontal levels on the corresponding carriers of said supporting members.

5. An implement as claimed in claim 3, wherein said supporting members include a rotatable member and a plurality of rods that trail on the ground with respect to the normal direction of travel.

6. An implement as claimed in claim 5, wherein the rear supporting member comprises elongated rod elements that work the soil at the rear of said soil working means.

7. An implement as claimed in claim 3, wherein said connecting members are adjustable in length and the arms of said carriers are pivoted to the frame portion adjacent the top thereof.

8. An implement as claimed in claim 2, wherein said carriers comprise parallelogram linkages which have vertically displaceable brackets.

9. An implement as claimed in claim 2, wherein at least one of said supporting members is a ground roller having elongate elements at its ground engaging periphery and said roller is rotatable about a substantially horizontal axis of rotation.

10. An implement as claimed in claim 2, wherein at least one of said supporting members comprises a levelling element.

11. An implement as claimed in claim 10, wherein a lower ground contacting portion of said levelling element has a substantially cylindrically curved configuration.

12. An implement as claimed in claim 10, wherein said levelling element is pivotably connected to carrier brackets and said brackets are pivoted to the frame portion and to the connection members.

13. An implement as claimed in claim 12, wherein the axis about which said levelling element is pivotable, is substantially parallel to the axis about which said brackets are pivotable relative to said frame portion.

14. An implement as claimed in claim 12, wherein said levelling element is freely pivotable within limits defined by stops on said brackets, each levelling element comprising a forward plate-shaped part that is inclined upwardly and forwardly from a junction with a rear plate-shaped part that is horizontal.

15. An implement as claimed in claim 2, wherein the leading supporting member comprises ground wheels mounted on respective bracket elements and said elements are connected to the carrier of said leading member.

16. A soil cultivating implement comprising a frame and a transverse row of soil working members being supported on an elongated portion of said frame, a leading supporting member being pivoted to the frame and positioned in front of said soil working means, a rear supporting member being pivoted to the implement and located to the rear of said frame portion, each of the supporting members bearing on the ground and supporting the implement during normal operation, said members being interconnected to one another by at least one plural sided linkage, an upper link of said linkage being an adjustable connecting member located substantially above said frame portion and extending in the direction of implement travel, said connecting member being pivoted to upwardly extending arms of corresponding carriers of the leading and rear supporting members, the lower portions of said arms being pivoted to said frame, whereby the vertical movements of one supporting member are transmitted to the other supporting member.

17. An implement as claimed in claim 16, wherein said linkage is a parallelogram linkage and a lower link is comprised by strip means secured to the top of said frame portion.

18. An implement as claimed in claim 16, wherein the leading supporting member is carried by a forward parallelogram linkage that is pivoted to the front of said first mentioned linkage.

19. An implement as claimed in claim 18, wherein a rear parallelogram linkage is pivoted to the rear of said first mentioned linkage and the rear supporting member is carried by the rear linkage.

* * * * *